United States Patent
Ahn et al.

(10) Patent No.: US 9,093,687 B2
(45) Date of Patent: Jul. 28, 2015

(54) SEALING CASE

(71) Applicant: Samsung SDI Co., LTD., Yongin-si, Gyeonggi-do (KR)

(72) Inventors: Sang-Kyu Ahn, Yongin-si (KR); Jun-Ho Lee, Yongin-si (KR)

(73) Assignee: SAMSUNG SDI CO., LTD., Yongin-Si Gyeonggi-Do (KR)

( * ) Notice: Subject to any disclaimer, the term of this patent is extended or adjusted under 35 U.S.C. 154(b) by 205 days.

(21) Appl. No.: 13/799,906

(22) Filed: Mar. 13, 2013

(65) Prior Publication Data

US 2014/0106196 A1     Apr. 17, 2014

(30) Foreign Application Priority Data

Oct. 15, 2012  (KR) .................. 10-2012-0114218

(51) Int. Cl.
*H01M 2/10*      (2006.01)
(52) U.S. Cl.
CPC .................................. *H01M 2/1072* (2013.01)
(58) Field of Classification Search
CPC   H01M 2/0408; H01M 2/0413; H01M 2/1016
USPC .................................................. 429/100, 185
See application file for complete search history.

(56) References Cited

U.S. PATENT DOCUMENTS

2010/0147846 A1*  6/2010  Soibel et al. ................. 220/202
2010/0304214 A1*  12/2010  Itoh et al. ..................... 429/185

FOREIGN PATENT DOCUMENTS

| KR | 2007-0030379 A | 3/2007 |
| KR | 2011-0103757 A | 9/2011 |
| KR | 2012-0021589 A | 3/2012 |

\* cited by examiner

*Primary Examiner* — Kenneth Douyette
*Assistant Examiner* — James Lee
(74) *Attorney, Agent, or Firm* — Knobbe, Martens, Olson & Bear LLP (57) ABSTRACT

A sealing case including a main body, a cover and a sealing member is disclosed. The main body has a first surface opened to a housing space therein. The cover is disposed over the first surface. The sealing member is interposed between the main body and the cover. The main body includes a first fastening portion protruding toward the sealing member. The cover includes a second fastening portion protruding toward the sealing member. The first and second fastening portions are spaced apart from each other. The main body and the cover are coupled together to be water-tight.

12 Claims, 6 Drawing Sheets

SEALING CASE

CROSS-REFERENCE TO RELATED APPLICATIONS

This application claims priority to and the benefit of Korean Patent Application No. 10-2012-0114218, filed on Oct. 15, 2012, in the Korean Intellectual Property Office, the entire content of which is incorporated herein by reference.

BACKGROUND

1. Field

The present disclosure relates to a sealing case, and more particularly, to a sealing case having improved sealing performance.

2. Description of the Related Technology

Battery packs have recently been used as power sources, and may be configured as large-capacity power sources to output high power. Some battery packs are used by being buried in the ground for safety purposes. In this case, the battery packs are stably maintained for a long period of time even in an environment with high humidity by being housed using a sealing case. In the sealing case, a gasket capable of performing surface-to-surface or line-to-line coupling using silicon sealing, foaming, etc. is interposed between a cover and a main body, in a state in which a separate structure is not provided to the cover and the main body, so as to have a watertight structure. Because, however, an external fluid may penetrate into the sealing case due to abrasion of the gasket over time, safety problems may occur.

SUMMARY OF CERTAIN INVENTIVE ASPECTS

In a first aspect, a sealing case having improved watertightness is provided.

In another aspect, a sealing case capable of stably keeping battery packs for a long period of time even in a high moisture environment is provided.

In another aspect, a sealing case is provided that includes, for example, a main body having a first surface opened to a housing space therein, a cover disposed over the first surface of the main body, and a sealing member interposed between the main body and the cover.

In some embodiments, the main body includes a first fastening portion protruding toward the sealing member. In some embodiments, the cover includes a second fastening portion protruded toward the sealing member. In some embodiments, the first and the second fastening portions are spaced apart from each other. In some embodiments, the main body and the cover are coupled together to be water-tight.

In some embodiments, the sealing member includes an opening formed in a shape corresponding to the first and second fastening portions so as to house the first and second fastening portions. In some embodiments, the first and second fastening portions may cross each other and/or be configured to be forcibly inserted into the sealing member. In some embodiments, the first fastening portion may include a main rib extended toward the cover. In some embodiments, the second fastening portion may include a cover rib extended toward the main body so as to be substantially parallel with the main rib. In some embodiments, the main rib may be extended to protrude at an end of the main body. In some embodiments, the end of the main body may be stepped while having the main rib interposed between stepped portions.

In some embodiments, the end of the main body may be configured with an outer stepped portion provided at the outside of the main rib and an inner stepped portion provided at the inside of the main rib. In some embodiments, a step difference between the outer stepped portion and the main rib may be less than that between the inner stepped portion and the main rib. In some embodiments, the outermost surface of the sealing member may be formed or positioned substantially in parallel with the outermost surfaces of the main body and the cover, and the main rib may be provided inward from the outermost surface of the main body so that the main rib is surrounded by the outermost surface of the sealing member. In some embodiments, the first fastening portion may further include a first protruding portion protruded at the end of the main rib. In some embodiments, the second fastening portion may further include a second protruding portion protruded at an end of the cover rib. In some embodiments, the first protruding portion may be protruded toward the cover rib so as to be inclined with respect to the main rib. In some embodiments, the second protruding portion may be protruded to be inclined in a direction facing the first protruding portion with respect to the cover rib.

In some embodiments, an end of the first or of the second protruding portion may be rounded. In some embodiments, the first protruding portion may include a first facing portion provided adjacent to the main rib. In some embodiments, the second protruding portion may include a second facing portion provided adjacent to the cover rib. In some embodiments, the first and second facing portions may be provided to face each other. In some embodiments, the first protruding portion may be protruded toward the cover rib so as to be substantially perpendicular with respect to the main rib. In some embodiments, the second protruding portion may be protruded to be substantially perpendicular with respect to the cover rib in the opposite direction to the first protruding portion. In some embodiments, the cover may further include a guide portion provided inside the cover rib to be spaced apart from the cover rib. In some embodiments, the sealing case may include a main rib, a cover rib and a guide portion, which are sequentially provided, and a guide portion provided at the innermost side of the sealing case. In some embodiments, the sealing member may include first and second opening which are sequentially provided. In some embodiments, the first opening may house the main rib. In some embodiments, the second opening may house the cover rib. In some embodiments, the guide portion may be provided to support an inner surface of the sealing member.

In another aspect, a sealing case having improved watertightness is provided.

In another aspect, a sealing case capable of stably keeping battery packs for a long period of time even in a high moisture environment is provided.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION OF CERTAIN INVENTIVE EMBODIMENTS

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, an exemplary embodiment will be described in detail with the accompanying drawings.

Figure 1:
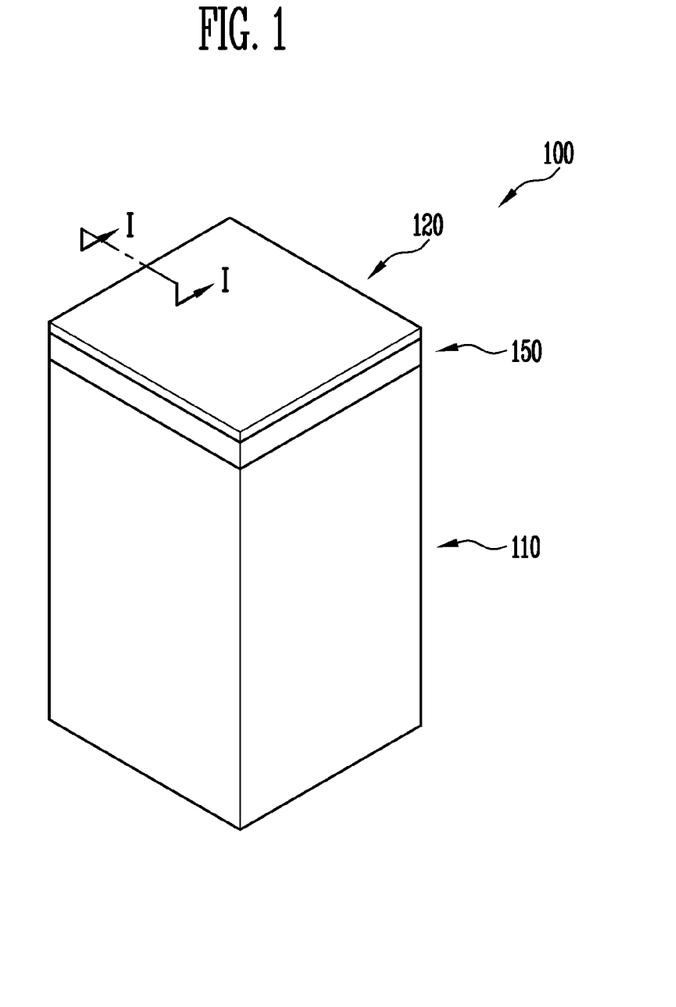
FIG. 1 is a perspective view of a sealing case according to an embodiment of the present disclosure.
Figure 2:
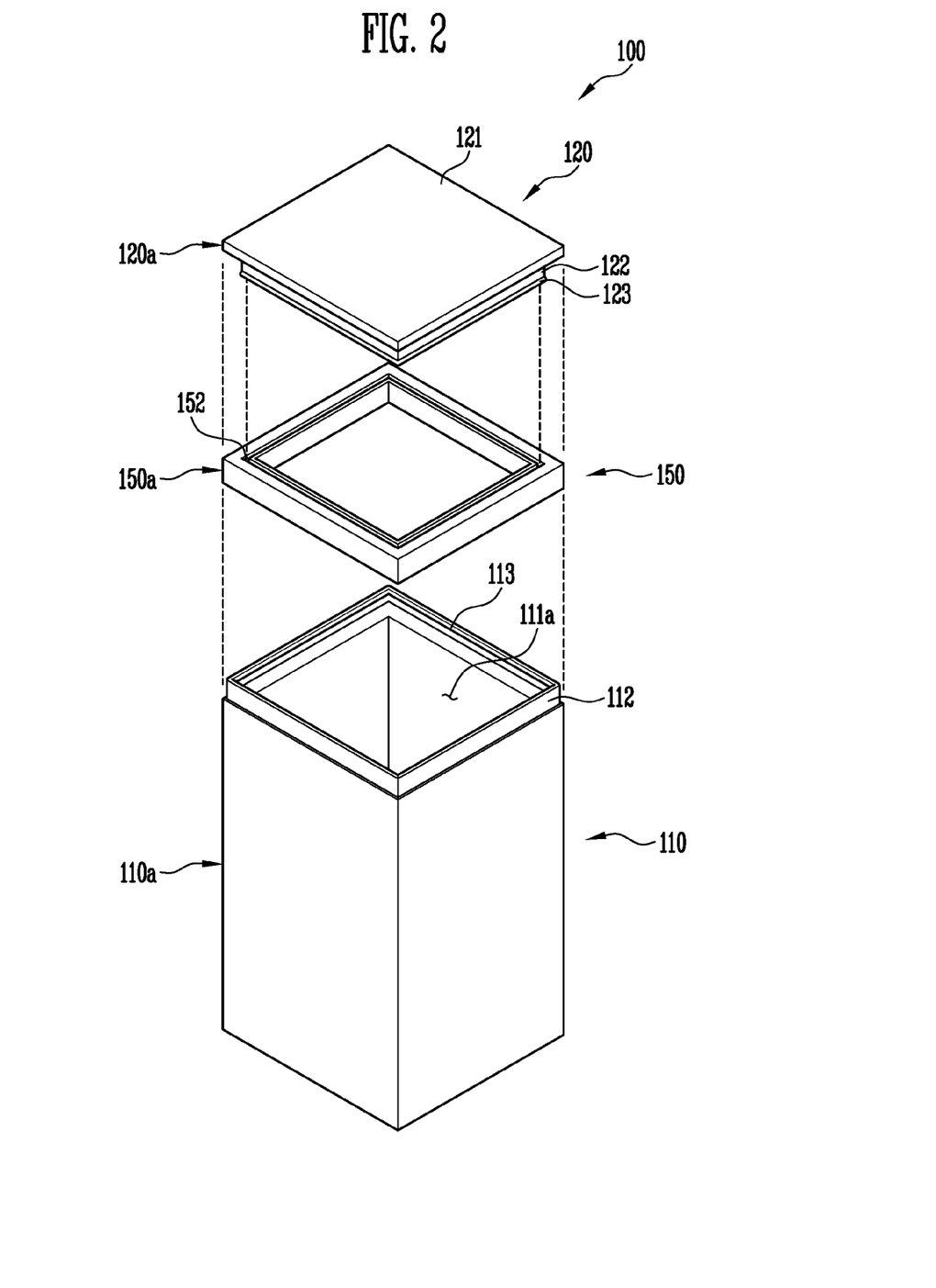
FIG. 2 is an exploded perspective view of the sealing case of FIG. 1.

FIG. 1 is a perspective view of a sealing case according to an embodiment of the present disclosure. FIG. 2 is an exploded perspective view of the sealing case of FIG. 1. Referring to FIGS. 1 and 2, the sealing case 100 includes a main body 110 having a first surface 111a opened to have a housing space, a cover 120 disposed over the first surface 111a of the main body 110, and a sealing member 150 interposed between the main body 110 and the cover 120. At least one first fastening portion 112 and 113 protruded toward the sealing member 150 is provided to the main body 110, and at least one second fastening portion 122 and 123 protruded toward the sealing member 150 is provided to the cover 120. The first and second fastening portions 112, 113, 122 and 123 are disposed to be spaced apart from each other, and the main body 110 and the cover 120 are coupled to be water-tight.

The sealing member 150 may be provided with one or more openings 152 provided to have a shape corresponding to the first and second fastening portions 112, 113, 122 and 123 configured to house the first and second fastening portions 112, 113, 122 and 123. The first and second fastening portions 112, 113, 122 and 123 are disposed to cross each other. Thus, the first and second fastening portions 112, 113, 122 and 123 may be configured for forcible insertion into the sealing member 150.

The main body 110 has the first surface 111a opened to have the housing space therein. The main body 110 may be formed, for example, in a box shape, and the first fastening portion 112 and 113 may be protruded at an end of the main body 110. The first fastening portion may be provided along an outer circumferential portion of the first surface 111a. At least one battery pack may be provided inside the main body 110. The battery pack may be configured to include at least one battery cell that generates electricity energy through reversible charging/discharging, a protective circuit module that protects the battery cell, etc.

The cover 120 may include a base portion 121 corresponding to the first surface 111a of the main body 110, and the second fastening portion 122 and 123 provided along corners of the base portion 121. Here, the second fastening portion 122 and 123 is provided to be inwardly spaced apart from the corners. The outermost surface 120a of the cover 120 may be provided in substantially parallel with the outermost surface 150a of the sealing member 150 and the outermost surface 110a of the main body 110.

Figure 3A:
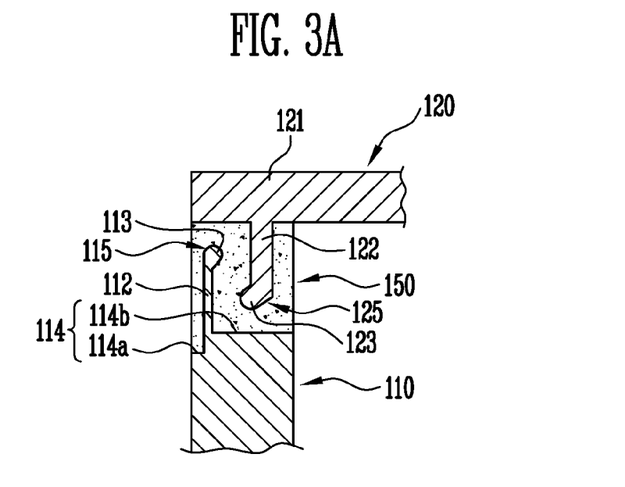
FIG. 3A is a sectional view taken along line I-I of FIG. 1.
Figure 3B:
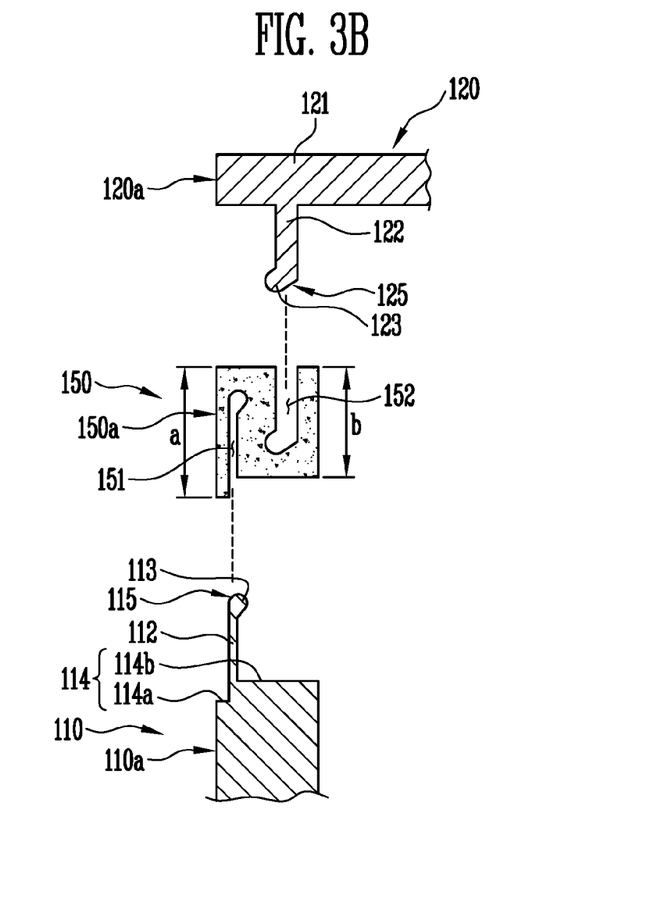
FIG. 3B is an exploded sectional view of FIG. 3A.

FIG. 3A is a sectional view taken along line I-I of FIG. 1. FIG. 3B is an exploded sectional view of FIG. 3A. Referring to FIGS. 3A and 3B, the first fastening portion 112 and 113 may include a main rib 112 extended toward the cover 120, and the second fastening portion 122 and 123 may include a cover rib 122 extended toward the main body 110 so as to be substantially parallel with the main rib 112. The first fastening portion 112 and 113 may further include a first protruding portion 113 protruded at an end of the main rib 112, and the second fastening portion 122 and 123 may further include a second protruding portion 123 protruded at an end of the cover rib 122.

The cover rib 122 is inwardly spaced apart from the main rib 112, and may be disposed to cross the main rib 112. For example, the first protruding portion 113 may be provided to face the second protruding portion 123 at the end of the main rib 112, and the second protruding portion 123 may be provided to face the first protruding portion 113 at the end of the cover rib 122. The first and second protruding portions 113 and 123 are provided in a separate space between the main rib 112 and the cover rib 122. In this case, first and second protruding portions 113 and 123 are provided at one and the other sides of the separate space. Thus, the separate space may be provided to be shorter than the sum of protrusion lengths of the first and second fastening portions 113 and 123.

The sealing member 150 may be provided with one or more openings 151 and 152 provided in a shape corresponding to the first and second fastening portions 112, 113, 122 and 123 so that the sealing member 150 is fastened to the first and second fastening portions 112, 113, 122 and 123. The openings 151 and 152 may include a first opening 151 through which the sealing member 150 is fastened to the first fastening portion 112 and 113 and a second opening 152 through which the sealing member 150 is fastened to the second fastening portion 122 and 123. The first opening 151 may be provided at the outside of the sealing member 150, and the second opening 152 may be provided to be inwardly spaced apart from the first opening 151.

The first protruding portion 113 may be protruded toward the cover rib 122 so as to be inclined (115) with respect to the main rib 112, and the second protruding portion 123 may be protruded to be inclined (125) in a direction facing the first protruding portion 113 with respect to the cover rib 122. Thus, the first and second protruding portions 113 and 123 can be easily inserted into the openings 151 and 152 by the portions provided to be inclined (115 and 125), respectively.

An end of the first or second protruding portion 115 or 125 may be rounded. For example, the main body 110 and the cover 120 may be made of FRP or reinforced plastic so as to have a predetermined strength, and the sealing member 150 may be made of a rubber, etc. having elasticity so as to improve sealing performance of the sealing member 150 with the first and second sealing portions 112, 113, 122 and 123. In this case, the sizes of the first and second openings 151 and 152 may be identical to or smaller than those of the first and second fastening portions 112, 113, 122 and 123 so that the first and second sealing portions 112, 113, 122 and 123 are forcibly inserted into the respective first and second openings 151 and 152. In a case where the first and second protruding portions 113 and 123 are formed in an angular shape, the sealing member 150 may be damaged in the forcible insertion. Therefore, an angular shape of the first and second protruding portions 113 and 123 allows the sealing member to be gradually damaged in the long-time use of the sealing member, and therefore, the water-tightness of the sealing case may be deteriorated. On the other hand, since the ends of the first and second protruding portions 113 and 123 are rounded, the first and second protruding portions 113 and 123 can be forcibly inserted into the sealing member 150 without damaging the sealing member 150.

The main rib 112 is extended to protrude at an end 114 of the main body 110, and the end 114 of the main body 110 may be provided to be stepped while having the main rib 112 interposed between the stepped portions. For example, the end 114 of the main body 110 may be configured to include an outer stepped portion 114a provided at the outside of the main rib 112 and an inner stepped portion 114b provided at the inside of the main rib 112. The step difference between the outer stepped portion 114a and the main rib 112 may be less than that between the inner stepped portion 114b and the main rib 112. In the sealing member 150, the first length a of the portion mounted on the outer stepped portion 114a may be longer than the second length b of the portion mounted on the inner stepped portion 114b so that the sealing member 150 corresponds to the end 114 of the main body 110. That is, the sealing member 150 may be provided so that the lengths in the longitudinal direction of the sealing member 150 are different as the first and second lengths a and b about the first opening 151.

The outermost surface 150a of the sealing member 150 is provided to be substantially parallel with the outermost surfaces 110a and 120a of the main body 110 and the cover 120, and the main rib 112 is provided inward from the outermost surface 110a of the main body 110, so that the main rib 112 can be surrounded by the outermost surface 150a of the sealing member 150. Thus, the sealing member 150 can be provided in substantially parallel with surroundings so as not to protrude at the portion at which the main body 110 and the cover 120 are fastened to each other. Since the main rib 112 and the cover rib 122 are surrounded by the sealing member 150, the sealing member 150 acts as a buffer even though the rigidity of the main rib 112 and the cover rib 122 is weakened due to the thin thicknesses of the main rib 112 and the cover rib 122. Thus, it is possible to prevent, from external impact, damage of the main rib 112 and the cover rib 122, particularly, the main rib 112 provided to the outer most surface 150a of the sealing member.

Figure 4A:
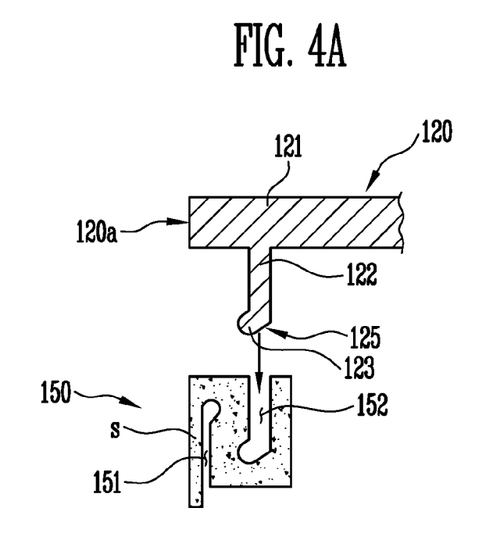
FIGS. 4A to 4C are sectional views schematically illustrating a method of fastening first and second fastening portions of the sealing case of FIG. 1.
Figure 4B:
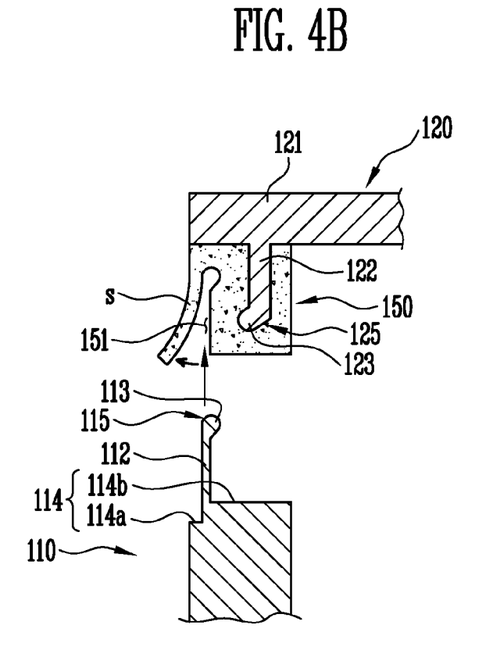
Figure 4C:
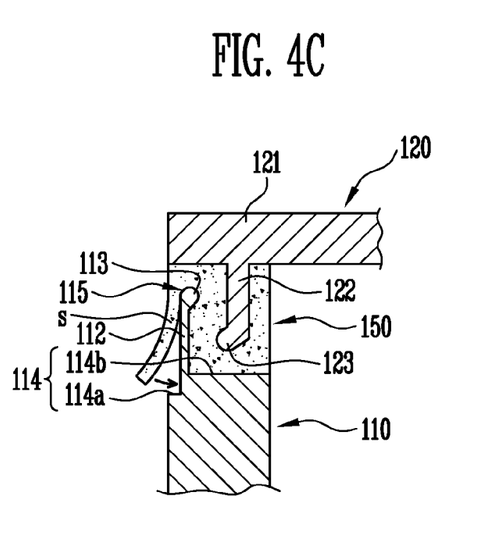

FIGS. 4A to 4C are sectional views schematically illustrating a method of fastening first and second fastening portions of the sealing case of FIG. 1. FIGS. 4A to 4C sequentially illustrate a state in which the cover 120 and the main body 110 are fastened to each other with the sealing member 150 interposed therebetween. First, as shown in FIG. 4A, the second fastening portion 122 and 123 is inserted into the second opening 152 of the sealing member 150. Since the sealing member 150 has elasticity, the first opening 151 provided outside the second opening 152 can provide a space when the second fastening portion 122 and 123 is fastened to the sealing member 150. Thus, the second fastening portion 122 and 123 can be easily inserted into the second opening 152. In the second fastening portion 122 and 123, the second protruding portion 123 is provided to be inclined as described above. Accordingly, the second fastening portion 122 and 123 can be slidingly inserted into the second opening 152.

Subsequently, an outer surface s of the sealing member 150 may be lifted toward the cover as shown in FIG. 4B. The outer surface of the sealing member 150 is formed longer than the inside of the sealing member 150 as described above, which enables the outer surface s of the sealing member 150 to be easily lifted toward the cover 120. If the outer surface s of the sealing member 150, the space of the first opening is provided as a wider space than the first fastening portion 112 and 113. Thus, the first fastening portion 112 and 113 can be easily inserted into the first opening 151. After the first fastening portion 112 and 113 is inserted into the first opening 151, the outer surface s of the sealing member 150 may be provided to overlap with the outer stepped portion 114a of the main body 110.

In the sealing case according to this embodiment, the first and second fastening portions are coupled to be water-tight by the sealing member, and thus battery packs can be stably used for a long period time even in a high-moisture environment. Typically, in a case where the first and second fastening portions are forcibly inserted into the sealing member, the sealing member is damaged, and therefore, there is a problem in that battery packs are used for a long period of time in a high-moisture environment. Although the sealing member is not damaged, there is a problem in that the production efficiency of battery packs is considerably deteriorated. In a case where the sealing member has a double barrier structure, it is advantageous to improve water-tightness. However, although the first and second fastening portions are forcibly inserted into the sealing member, there exists a partial space between the first and second fastening portions and the sealing member. Therefore, the forcible insertion is almost impossible. On the other hand, the sealing case according to this embodiment has the structure of the first and second fastening portions and the sealing member, so that it is possible to improve productivity, to prevent damage of the sealing member and to easily perform the forcible insertion so that there exists no space between the first and second fastening portions and the sealing member. Thus, it is possible to stably keep, for example, battery packs, etc. provided in the housing space of the sealing case. Further, micro-size moisture in addition to water as a fluid cannot penetrate from the outside to the inside of the sealing case. Furthermore, it is possible to prevent minute damage of the sealing member in the forcible insertion, so that battery pack can be stably used for a long period of time.

Hereinafter, other embodiments will be described with reference to FIGS. 5 and 6. Contents of these embodiments, except the following contents, are similar to those of the embodiment described with reference to FIGS. 1 to 4, and therefore, their detailed descriptions will be omitted.

Figure 5:
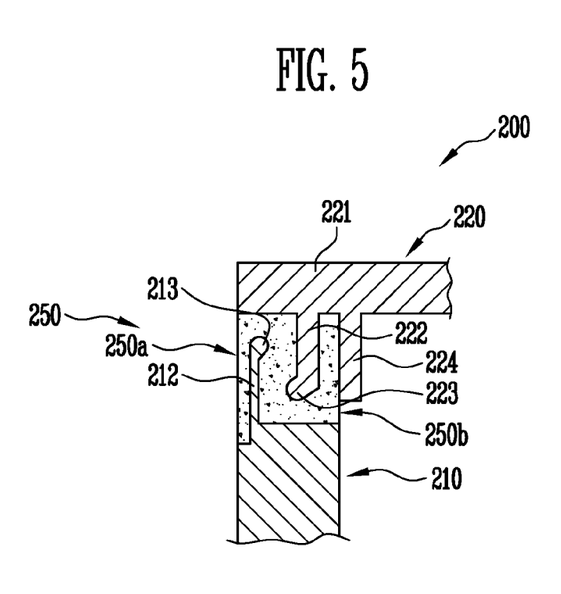
FIG. 5 is a sectional view schematically illustrating first and second fastening portions of a sealing case according to another embodiment of the present disclosure.

FIG. 5 is a sectional view schematically illustrating first and second fastening portions of a sealing case according to another embodiment of the present disclosure. Referring to FIG. 5, the sealing case 200 may include a main body 210, a cover 220 and a sealing member 250 interposed between portions at which the main body 210 and the cover 220 are coupled to each other. The main body 210 and the cover 220 are provided with first and second fastening portions 212, 213, 222 and 223 to be forcibly inserted into first and second openings, respectively.

The second fastening portion 222 and 223 include a base portion 221 facing the main body 210, and a cover rib 222 and a second protruding portion 223, protruded toward the main body 210 from the base portion 221. In this case, the cover 220 may include a guide portion 224 provided inside the cover rib 222 so as to be spaced apart from the cover rib 222. That is, the cover rib 222 and the guide portion 224, provided to be substantially perpendicular with respect to a surface of the base portion 221 may be extended to protrude from the base portion 221. The cover rib 222 and the guide portion 224 may be provided to be spaced apart from each other. In this case, the second protruding portion 223 provided at an end of the cover rib 222 may be provided to face the opposite direction to the guide portion 224.

The sealing case 200 according to this embodiment includes the main rib 212, the cover rib 222 and the guide portion 224, which are sequentially provided. In this case, the guide portion 224 may be provided at the innermost side of the sealing case 200. The sealing member 250 includes the first and second openings, which are sequentially provided. The first opening houses the main rib 212 therein, and the second opening houses the cover rib 222 therein. The guide portion 224 may be provided to support an inner surface 250b of the sealing member 250.

In the process of forcibly inserting the first and second fastening portions 212, 213, 222 and 223 into the sealing member 250, the inner surface 250b of the sealing member 250 may be pushed inward while the second fastening portion 222 and 223 is inserted into the second opening of the sealing member 250. In this case, the guide portion 224 supports the inner surface 250b of the sealing member 250, so that it is possible to prevent the sealing member 250 from being pushed inward, thereby improving the sealing performance between the sealing member 250 and the first and second fastening portions 212, 213, 222 and 223. Further, a barrier is further provided to the portion at which the main body 210 and the cover 220 are coupled by the guide portion 224, so that penetration of an external matter into the sealing case can be more efficiently prevented.

Figure 6:
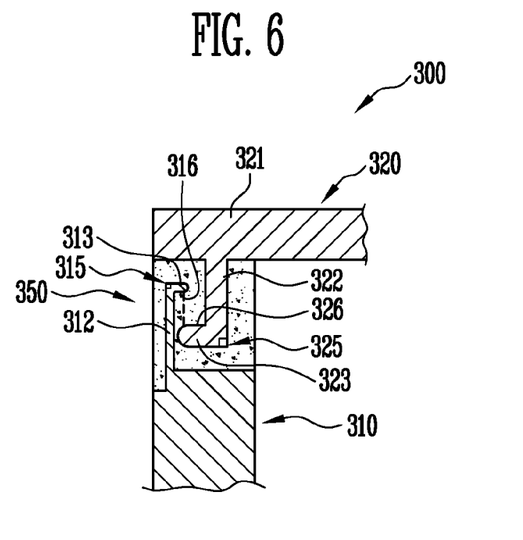
FIG. 6 is a sectional view schematically illustrating first and second fastening portions of a sealing case according to still another embodiment of the present disclosure.

FIG. 6 is a sectional view schematically illustrating first and second fastening portions of a sealing case according to still another embodiment of the present disclosure. Referring to FIG. 6, in the sealing case 300 according to this embodiment, first and second fastening portions 312, 313, 322 and 323 respectively provided to a main body 310 and a cover 320 are inserted into a sealing member 350. In this case, the first fastening portion 312 and 313 may be configured to include a main rib 312 and a first protruding portion 313, and the second fastening portion 322 and 323 may be configured to include a cover rib 322 and a second protruding portion 323. For example, the first protruding portion 313 may be protruded toward the cover rib 322 so as to be substantially perpendicular 315 with respect to a surface of the main rib 312, and the second protruding portion 323 may be protruded to be substantially perpendicular 325 with respect to a surface of the cover rib 322 in a direction opposite to the first protruding portion 313.

In this case, the first protruding portion 313 includes a first facing portion 316 provided adjacent to the main rib 312, and the second protruding portion 323 includes a second facing portion 326 provided adjacent to the cover rib 323. The first and second facing portions 316 and 326 may be provided to face each other. The main rib 312 and the cover rib 323 may also be provided to face each other. Thus, the first and second fastening portions 312, 313, 322 and 323 allow the sealing member 350 to be fixed in all directions, so that it is possible to improve the fastening power between the first and second fastening portions 312, 313, 322 and 323.

While the present invention has been described in connection with certain exemplary embodiments, it will be appreciated by those skilled in the art that various modifications and changes may be made without departing from the scope of the present disclosure. It will also be appreciated by those of skill in the art that parts mixed with one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A sealing case, comprising:
a main body having a first surface opened to a housing space therein;
a cover disposed over the first surface; and
a sealing member interposed between the main body and the cover,
the main body having a first fastening portion protruding toward the sealing member,
the cover having a second fastening portion protruding toward the sealing member,
the first and the second fastening portions spaced apart from each other,
the main body and the cover are coupled together to be water-tight by the sealing member, the first fastening portion, and the second fastening portion,
the first fastening portion including a main rib extended toward the cover,
the second fastening portion including a cover rib extended toward the main body,
the cover rib positioned substantially parallel to the main rib,
the main rib formed protruding at an end of the main body,
the end of the main body being stepped while having the main rib interposed between stepped portions,
the end of the main body including an outer stepped portion at the outside of the main rib and an inner stepped portion at the inside of the main rib, and
the step difference between the outer stepped portion and the main rib being less than that between the inner stepped portion and the main rib.

2. The sealing case of claim 1, wherein the sealing member includes an opening formed in a shape configured to mate with the first and the second fastening portions.

3. The sealing case of claim 1, wherein the ends of the first and the second fastening portions extend past each other, and wherein the first and the second fastening portions are configured for forcible insertion into the sealing member.

4. The sealing case of claim 1, wherein an outermost surface of the sealing member is substantially parallel with an outermost surface of the main body and an outermost surface of the cover, and wherein the main rib is positioned with respect to the outermost surface of the main body so that the main rib is surrounded by the outermost surface of the sealing member.

5. The sealing case of claim 1, wherein the first fastening portion includes a first protruding portion at the end of the main rib, and wherein the second fastening portion includes a second protruding portion at an end of the cover rib.

6. The sealing case of claim 5, wherein the first protruding portion is formed protruding toward the cover rib with respect to the main rib, and wherein the second protruding portion is formed protruding in a direction facing the first protruding portion with respect to the cover rib.

7. The sealing case of claim 5, wherein an end of the first or the second protruding portion is rounded.

8. The sealing case of claim 5, wherein the first protruding portion includes a first facing portion adjacent to the main rib, wherein the second protruding portion includes a second facing portion adjacent to the cover rib, and wherein the first and the second facing portions are positioned to face each other.

9. The sealing case of claim 5, wherein the first protruding portion is protruded toward the cover rib so as to be substantially perpendicular with respect to the main rib, and wherein the second protruding portion is protruded to be substantially perpendicular with respect to the cover rib in a direction opposite to the first protruding portion.

10. The sealing case of claim 1, wherein the cover further includes a guide portion inside of and spaced apart from the cover rib.

11. The sealing case of claim 10, wherein the guide portion is provided at the innermost side of the sealing case.

12. The sealing case of claim 11, wherein the sealing member includes a first and a second opening, wherein the first opening mates with the main rib, wherein the second opening mates with the cover rib, and wherein the guide portion is configured to support an inner surface of the sealing member.

\* \* \* \* \*